(12) United States Patent
Su

(10) Patent No.: US 8,137,502 B2
(45) Date of Patent: Mar. 20, 2012

(54) STRIPING APPARATUS AND STRIPING METHOD

(75) Inventor: Jing Su, Beijing (CN)

(73) Assignee: Beijing Boe Optoelectronics Technology Co., Ltd., Beijing (CN)

(*) Notice: Subject to any disclaimer, the term of this patent is extended or adjusted under 35 U.S.C. 154(b) by 1022 days.

(21) Appl. No.: 12/061,555

(22) Filed: Apr. 2, 2008

(65) Prior Publication Data

US 2008/0289763 A1 Nov. 27, 2008

(30) Foreign Application Priority Data

May 21, 2007 (CN) .......................... 2007 1 0099458

(51) Int. Cl.
*B32B 38/10* (2006.01)
(52) U.S. Cl. ......................... 156/702; 156/715; 156/751
(58) Field of Classification Search .................. 156/344, 156/584, 702, 715, 751, 759
See application file for complete search history.

(56) References Cited

U.S. PATENT DOCUMENTS

| | | | | |
|---|---|---|---|---|
| 4,897,148 A | * | 1/1990 | Orlandi | 156/584 |
| 5,125,140 A | * | 6/1992 | Sticht | 29/33 P |
| 5,312,505 A | * | 5/1994 | Sumi et al. | 156/584 |
| 5,328,547 A | * | 7/1994 | Boldrini et al. | 156/584 |
| 6,153,042 A | * | 11/2000 | Tominaga | 156/344 |
| 7,521,384 B2 | * | 4/2009 | Kanazawa et al. | 438/457 |
| 2003/0037877 A1 | * | 2/2003 | Brinkmann | 156/344 |

FOREIGN PATENT DOCUMENTS

| | | |
|---|---|---|
| JP | 4-129963 A | 4/1992 |
| JP | 4-223971 A | 8/1992 |
| JP | 8-181489 A | 7/1996 |
| JP | 10-139273 A | 5/1998 |
| JP | 2000-321367 A | 11/2000 |
| JP | 2002-326615 A | 11/2002 |
| JP | 2003-252525 A | 9/2003 |
| JP | 2006-199478 A | 8/2006 |
| JP | 2006-290608 A | 10/2006 |

* cited by examiner

*Primary Examiner* — Mark A Osele
(74) *Attorney, Agent, or Firm* — Sheridan Ross P.C.

(57) ABSTRACT

The present invention relates to a striping apparatus and a striping method. The apparatus for stripping a film from a product comprising a transfer device for transferring the product; a film stripping device disposed above a stripping operation area of the transfer device for stripping the film from the product; and a plurality of guiding devices disposed on both sides of the transfer device in the stripping operation area for guiding the transfer direction of the product.

5 Claims, 5 Drawing Sheets

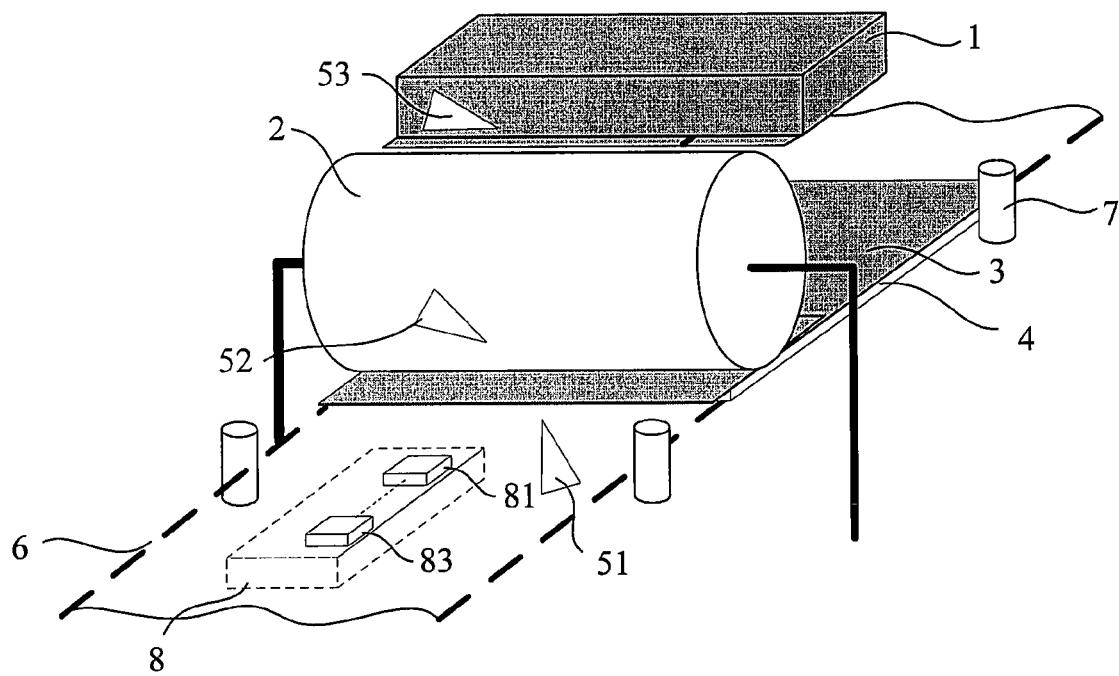
Fig. 2A
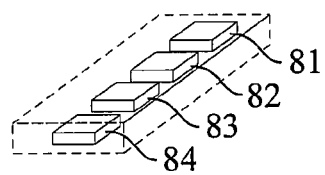
Fig. 2B
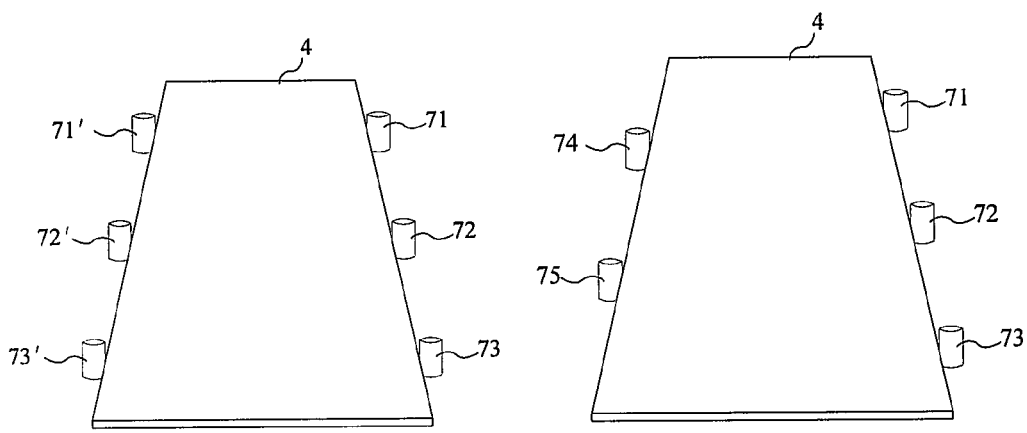
Fig. 3A                    Fig. 3B

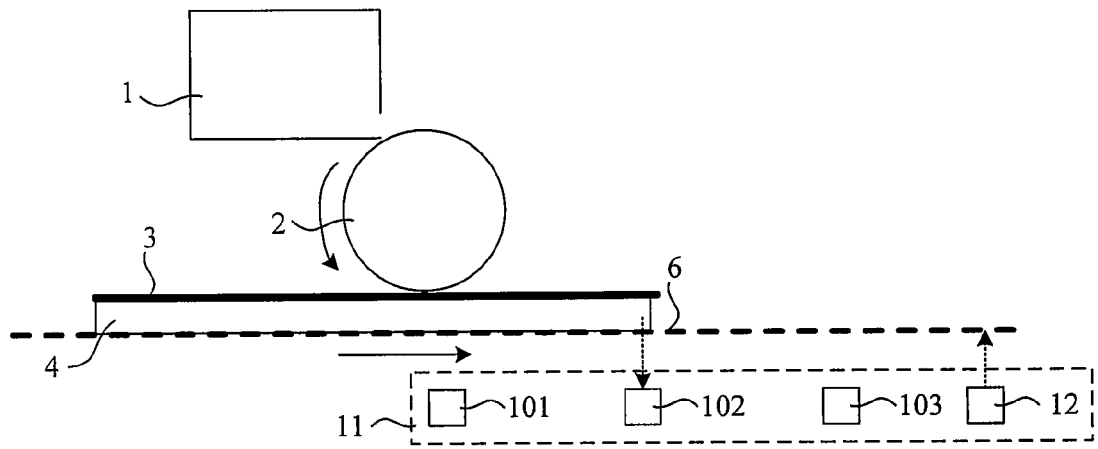

Fig. 6

When a glass sensor at a first position senses the presence of the glass substrate, the speed of the transfer device is increased from a first speed value to a second speed value and is kept at the second speed value. —— 201

When a glass sensor at a second position senses the presence of the glass substrate, the speed of the transfer device is increased from the second speed value to a third speed value and is kept at the third speed value. —— 202

When a glass sensor at a third position senses the presence of the glass substrate, the speed of the transfer device is decreased from the third speed value to a fourth speed value and is kept at the fourth speed value. —— 203

Fig. 7

STRIPING APPARATUS AND STRIPING METHOD

FIELD OF THE INVENTION

The present invention relates to a stripping apparatus and a stripping method, in particularly, to a stripping apparatus and a stripping method used for stripping a film from a surface of a glass substrate.

BACKGROUND OF THE INVENTION

A protective film is typically formed on a surface of a glass substrate of thin film transistor liquid crystal display (TFT LCD) in a TFT LCD production line, and therefore the first step in the process is usually removing the protective film from the surface of the glass substrate by a stripping apparatus and then transferring the glass substrate away from the stripping apparatus for a subsequent cleaning.

An operation process in a conventional stripping apparatus is shown in FIGS. 1A-1C. The conventional stripping apparatus comprises a film collector 1, vacuum suction roller 2, and nozzles 51, 52 and 53. A protective film 3 is formed on a glass substrate 4. The protective film 3 can be removed from the glass substrate 4 in a following manner. First, a transfer device 6 transfers the glass substrate 4 with the protective film 3 to pass under the vacuum suction roller 2 while the nozzle 51 blows the front end of the protective film 3 from the glass substrate 4 towards the vacuum suction roller 2, as shown in FIG. 1A. Then the protective film 3 is sucked onto the vacuum suction roller 2, as shown in FIG. 1B. With the help from nozzles 52 and 53, the protective film 3 is then transferred into the film collector 1 by the vacuum suction roller 2, as shown in FIG. 1C. During the above processes, the transfer speed of the glass substrate 4 is relatively fast, for example, in a range of about 0.1 m/s~0.2 m/s. However, in some cases, the protective film 3 is not completely removed from the glass substrate 4 by either dangling on the nozzle 51, 52 or 53 or staying on the transfer device 6, thus blocking the normal transfer of the current glass substrate 4 or a next glass substrate in the production line, or in some cases, deflecting the glass substrate 4 from a normal track. This in turn can cause the damage to the glass substrate 4. Furthermore, when the protective film 3 fails to be removed from the glass substrate 4, the glass substrate 4 still moves forward in the production line until being detected by a film sensor in the next stage. At the time, the transfer device 6 stops the transfer of the glass substrate 4 and the production line halts.

The above design of the conventional stripping apparatus may increase the damage risk of the glass substrate since the glass substrate may be deflected from the normal track and fallen off the transfer device. Furthermore the stripping failure rate is also high due to the relatively fast transfer speed of the glass substrate. Since there is also lack of appropriate control means to secure the subsequent production after the stripping failure, the overall production yield suffers.

SUMMARY OF THE INVENTION

According to an aspect of the present invention, there is provided an apparatus for stripping a film from a product. The apparatus may comprise a transfer device for transferring the product; a film stripping device disposed above a stripping operation area of the transfer device for stripping the film from the product; and a plurality of guiding devices disposed on both sides of the transfer device in the stripping operation area for guiding a transfer direction of the product.

Preferably, the guiding devices are guiding rollers disposed on both sides of the transfer device. The guiding rollers on the same side of the transfer device can be spaced apart, or the guiding rollers on the opposite sides of the transfer device can be disposed either opposing or displaced with respect to each other.

The apparatus can further comprise a monitor module. The monitor module can comprise a film sensor disposed below the film stripping device for detecting the presence of the film on the product after a stripping operation by the film stripping device; and a control device electrically connected to the film sensor and the transfer device for controlling the transfer direction of the transfer device based on a detection result from the film sensor.

Preferably, the monitor module can further comprise a counter device electrically connected to the film sensor for recording the detection result and an alarming device electrically connected to the control device or the counter device.

Furthermore, the apparatus can comprise a buffering device for controlling a transfer speed of the product. The buffering device can comprise at least one sensor disposed adjacent to the transfer device for detecting a position of the product and can comprise a speed control device electrically connected to the transfer device for controlling a speed of the transfer device.

According to another aspect of the present invention, there is provided a method for stripping a film from a product. The method can comprise the steps of transferring the product on a transfer device to a film stripping device; and stripping the film from the product by the film stripping device. The transfer direction of the product is guided by a guiding device along a prescribed direction during the steps of transferring the product and stripping the film from the product.

Preferably, after the step of stripping the film from the product, the method can further comprise a step of detecting whether the film is completely stripped from the product and a step of transferring the product back for stripping when the film is not completely stripped from the product.

Preferably, a transfer speed of the product is variable. For example, the transfer speed can be changed in a step manner or continually to follow a prescribed program.

Preferably, when the product is transferred to a first position along the transfer direction, the transfer speed of the product is increased from a first speed value to a second speed value and keeps at the second speed value. When the product is transferred to a second position along the transfer direction, the transfer speed of the product is increased from the second speed value to a third speed value and keeps at the third speed value. When the product is transferred to a third position along the transfer direction, the transfer speed of the product is decreased from the third speed value to a fourth speed value and keeps at the fourth speed value.

Preferably, the method further comprises a step of detecting a position of the product along the transfer direction.

Preferably, the step of detecting whether the film is completely stripped from the product may further comprise the steps of clearing a counter when the film is completely stripped, otherwise increasing the value of the counter by one and determining whether the counter value reaches threshold value; and stopping the transfer device and optionally raising an alarm when the threshold value is reached, otherwise performing the step of transferring the product back for stripping.

The stripping apparatus and the stripping method according to the embodiments of the present invention can prevent the product from deflecting from the transfer direction due to the stripping operation, and in turn prevent the product from falling off the transfer device due to the above deflection, therefore reducing the damage risk of the product and adversely effects on the subsequent processes. Furthermore, the transfer speed can be controlled effectively and thus the force exerted upon the glass substrate by the protective film during stripping operation is reduced, thus reducing the risk of the stripping failure. Furthermore, the transfer speed can be appropriately controlled during different operation stages of the stripping process and the production yield is improved.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the following detailed description.

BRIEF DESCRIPTION OF THE DRAWINGS

The present invention will become more fully understood from the detailed description given hereinafter and the accompanying drawings which are given by way of illustration only, and thus are not limitative of the present invention and wherein:

FIG. 2A is a schematic view showing a stripping apparatus according to a first embodiment of the invention;

FIG. 2B is a schematic view showing another monitor module in the stripping apparatus according to the first embodiment of the invention;

FIGS. 3A and 3B are schematic views showing different arrangement of the guiding devices in the stripping apparatus according to the first embodiment of the invention;

FIG. 6 is a schematic view showing a stripping apparatus according to a second embodiment of the invention; and FIG. 7 is a flow chart showing a buffering control operation in a stripping method according to the second embodiment of the invention.

DESCRIPTION OF THE PREFERRED EMBODIMENTS

First Embodiment

Figure 1A:
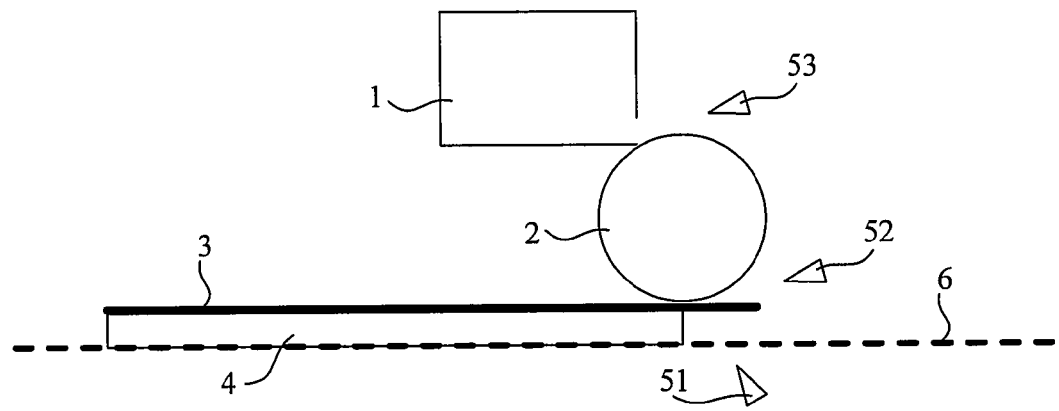
FIG. 1A-1C are schematic views showing an operation process of a conventional stripping apparatus.
Figure 1B:
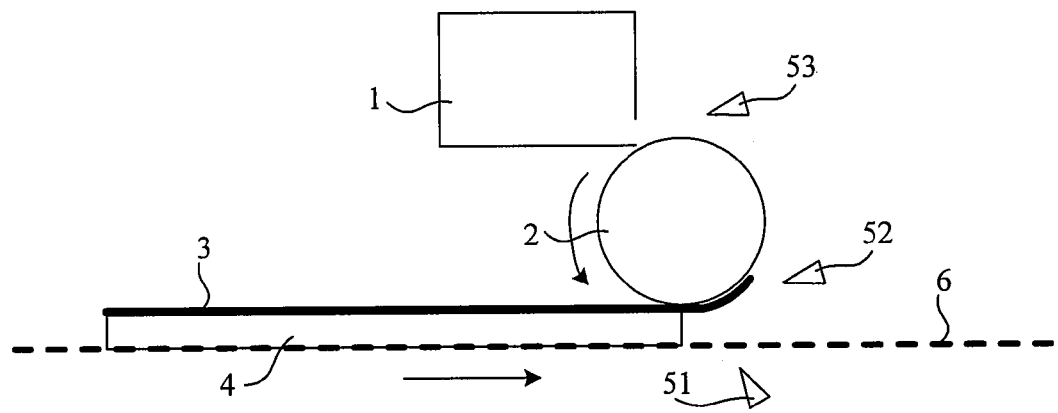
Figure 1C:
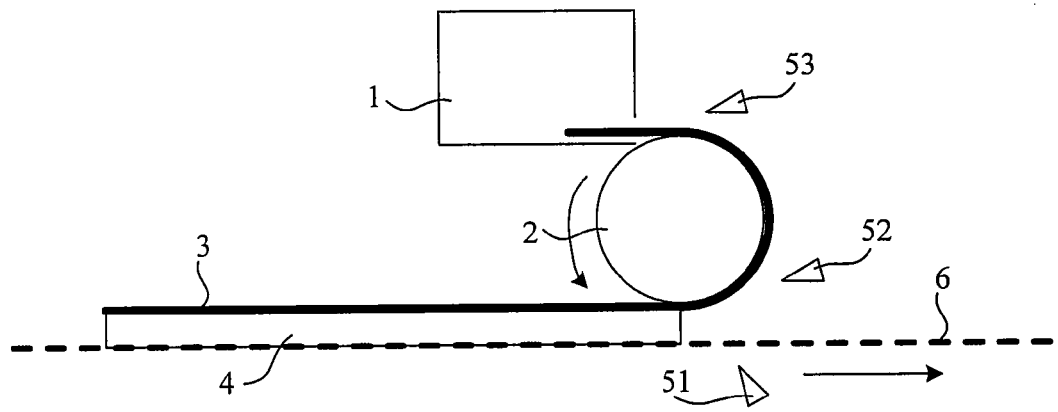

FIG. 2A is a schematic view showing a stripping apparatus according to a first embodiment of the invention, which is used to strip a protective film 3 from an upper surface of a glass substrate 4. The stripping apparatus comprises a film stripping device, i.e., a vacuum suction roller 2 disposed above a transfer device 6; a film collector 1 coupled with the vacuum suction roller 2 for collecting the protective film 3 wounded onto the vacuum suction roller 2; and nozzles 51, 52 and 53. The stripping apparatus can further comprise a plurality of guiding rollers 7, for example, vertical cylinders rotated with the movement of the glass substrate 4. The guiding rollers 7 are disposed on both sides of the transfer device 6 within a stripping operation area below the vacuum suction roller 2 so as to confine a transfer direction of the glass substrate 4. Therefore, the guiding rollers 7 serve to guide the transfer of the glass substrate 4. The stripping apparatus according to the first embodiment can further comprise a monitor module 8 comprising at least one film sensor 81 and a control device 83. The film sensor 81 is disposed below the vacuum suction roller 2 under the transfer device 6 towards a downstream direction of the transfer device 6 so as to detect whether the protective film 3 still remains on the glass substrate 4 when the glass substrate 4 is moved past the vacuum suction roller 2. The control device 83 is electronically connected to the film sensor 81 and the transfer device 6 so as to control the transfer direction of the transfer device 6 based on the result from the film sensor 81.

According to the operation procedure of the above stripping apparatus, the glass substrate 4 is loaded on the transfer device 6 to be transferred to a position below the vacuum suction roller 2 under the guidance of the guiding rollers 7. At the time, a front end of the protective film 3 on the upper surface of the glass substrate 4 is released from the glass substrate 4 by an air flow blown from the nozzle 51. Then, by an air flow blown from the nozzle 52 and the suction force of the vacuum suction roller 2, the protective film 3 is sucked up and is stripped from the glass substrate 4 and wounded onto the vacuum suction roller 2 with the transfer movement of the glass substrate 4 and the rotation of the vacuum suction roller 2. The glass substrate 4 passes under the vacuum suction roller 2 and moves to a position above the film sensor 81 in the monitor module 8, where the film sensor 81 detects whether the protective film 3 still remains on the glass substrate 4. Then the film sensor 81 sends the result to the control device 83 and the control device 83 controls the operation of the transfer device 6 based on the result. If there is no protective film 3 left on the glass substrate 4, that is, the stripping operation is complete, then the control device 83 controls the transfer device 6 to keep on running; otherwise, the control 83 controls the transfer device 6 to be reversed or halted as necessary. The stripping apparatus according to the first embodiment can detect the stripping result in time, and can provide remediation and subsequent control for the failed stripping operation, thus effectively reducing the loss caused by the stripping failure and improving the yield.

FIG. 2B is a schematic view showing another example of the monitor module 8 in the stripping apparatus according to the first embodiment of the invention. In addition to the film sensor 81 and control device 83, the monitor module 8 can further comprise a counter device 82 electrically connected to the film sensor 81 for registering the number of records detected by the film sensor 81. The monitor module 8 can further comprise an alarming device 84 electrically connected to the control device 83 for raising an alarm according to the control of the transfer device 6 by the control device 83. The alarming device 84 can also be electrically connected to the counter device 82 for raising an alarm according to the registered value of the counter device 82. During the stripping operation, the film sensor 81 sends the detection result to counter device 82 for registering. Then the detection result and the registered value are sent to the control device 83, which controls the transfer device 6 based on the detection result and the registered value. The control command or the registered value is then fed to the alarming device 84, which decides whether an alarming signal is needed. The glass substrate 4 proceeds under the guidance of the guiding rollers 7 throughout the above processes.

In the present embodiment, the stripping apparatus can further comprise other devices capable of stripping a surface film from a product, such as an adhesive tape wheel or an adhesive roller, which can strip the film by adhesion. The film sensor 81 can also be disposed above the transfer device 6 towards the downstream of the production line, as long as the film sensor 81 can detect in time whether the protective film 3 is still left on the glass substrate 4 after stripping. The guiding roller 7 can also be replaced by other guiding devices which can confine the transfer direction of the glass substrate 4. For example, a strap can be disposed between two upright columns on a side of the transfer device and escorts the glass substrate 4 on the production line. The guiding rollers 7 can also be arranged in various ways, such as the arrangement shown in FIG. 3A. Six guiding rollers 71, 71', 72, 72', 73 and 73' are spaced apart and disposed on both sides of the transfer device 6 with two corresponding rollers on the opposite sides facing each other. The spacing between the guiding rollers on a side can be 30 cm, for example. FIG. 3B shows another arrangement of the guiding rollers. Five guiding rollers 71, 72, 73, 74, and 75 are spaced apart and disposed on both sides of the transfer device 6 with the rollers on the opposite sides displaced with respect to each other. The guiding rollers can also be placed adjacent to each other, as long as they can rotate freely and confine the transfer direction of the product.

The stripping apparatus can prevent the product from deflecting from the transfer direction due to the stripping operation, and in turn prevent the product from falling off the transfer device due to the above deflection, therefore reducing the damage risk of the product and adversely effects on the subsequent processes. The stripping apparatus can be used to strip a protective film from a product surface and can be applied to various production lines requiring stripping operations.

Figure 4:
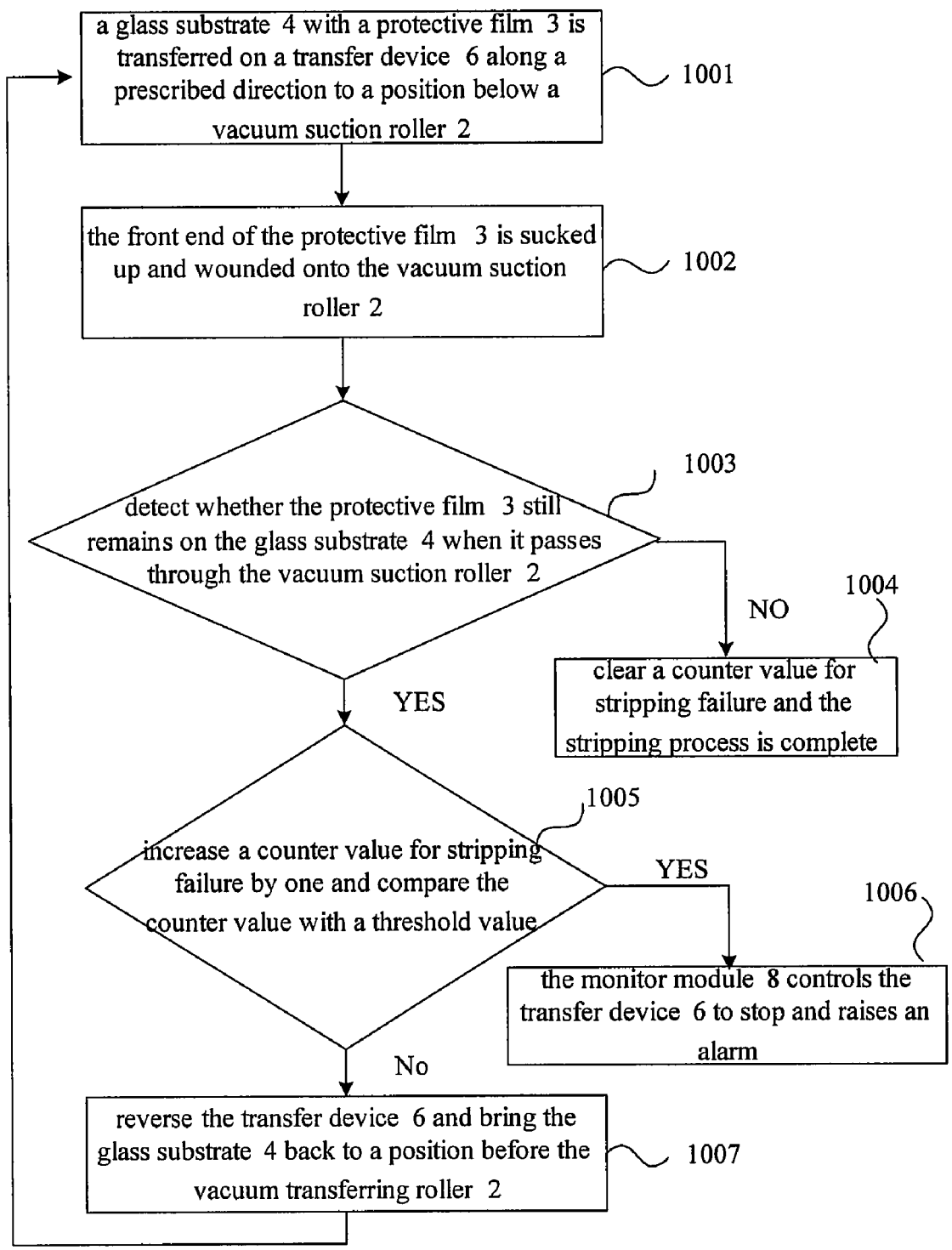
FIG. 4 is a flow chart showing a stripping method according to the first embodiment of the invention.
Figure 5A:
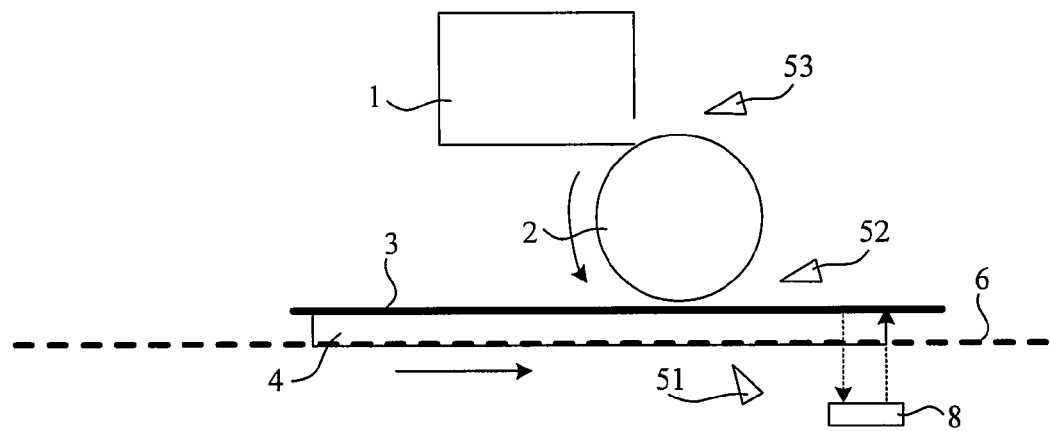
FIGS. 5A-5C are schematic views showing an operation process of the stripping apparatus according to the first embodiment of the invention.
Figure 5B:
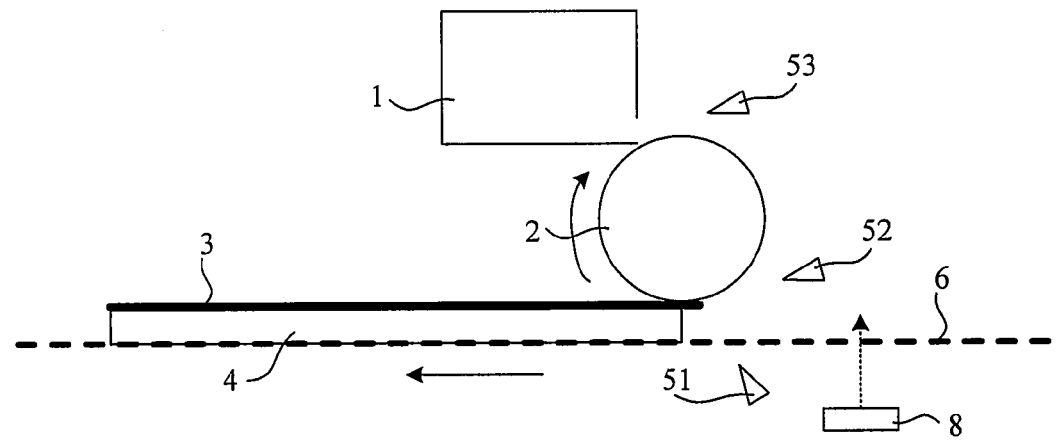
Figure 5C:
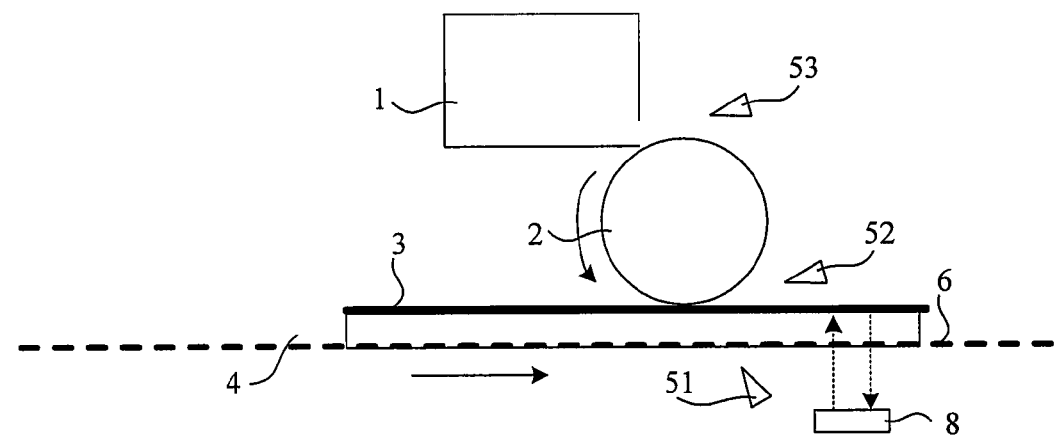

The stripping method according to the first embodiment of the present invention will be described in detail hereinafter. FIG. 4 is a flow chart showing the stripping method according to the first embodiment of the invention. FIGS. 5A-5C are schematic views showing an operation process of the stripping apparatus according to the first embodiment of the invention.

As shown in FIG. 4 and FIGS. 5A-5C, at step 1001, a glass substrate 4 with a protective film 3 is transferred on a transfer device 6 along a prescribed direction to a position below a vacuum suction roller 2. At step 1002, the front end of the protective film 3 is sucked up and wounded onto the vacuum suction roller 2. At step 1003, a monitor module 8 detects whether the protective film 3 still remains on the glass substrate 4 when it passes through the vacuum suction roller 2. If there is no protective film 3 left, the flow proceeds to step 1004, otherwise goes to step 1005. At step 1004, a counter value of a counter device for stripping failure is cleared and the stripping process is complete. At step 1005, the counter value for stripping failure is increased by one and the counter value is compared with a threshold value. If the threshold value is reached, the flow proceeds to step 1006, otherwise goes to step 1007. At step 1006, the monitor module 8 controls the transfer device 6 to stop and raises an alarm. At step 1007, the monitor module 8 controls the transfer device 6 to reverse and bring the glass substrate 4 back to a position before the vacuum suction roller 2 in the production line and the step 1001 is performed again.

The threshold value at step 1005 can be set as two, for example. In general, most of the protective films 3 on the glass substrates 4 can be removed within two trials. If the stripping operation failed twice consecutively, an abnormity very possibly takes place and the production line should be halted and an alarm should be raised. The threshold value can be also set as other values as necessary when the method is applied to other production lines requiring stripping operations. The present embodiment is only one of the preferred embodiments according to the present invention, and thus the details thereof can be changed accordingly. For example, the stripping method can simply comprise the steps of transferring the product to the stripping device for stripping the film, then detecting whether the stripping operation is successful and bringing the product back to the stripping device if the stripping is incomplete.

The above stripping method can also provide remediation to the stripping failure and prevent further production loss.

Second Embodiment

FIG. 6 is a schematic view showing a stripping apparatus according to a second embodiment of the invention. The stripping apparatus according to the second embodiment is substantially the same as the stripping apparatus according to the first embodiment. The stripping apparatus according to the second embodiment can further comprise a buffering device 11 disposed on the downstream of production line for controlling the transfer speed of the transfer device. The buffering device 11 can at least comprise a sensor for detecting the product position on the transfer device and a speed control device for controlling the transfer speed. The speed control device controls the speed of the transfer device based on the product position detected by the sensor. By way of example, the buffering device 11 comprises a first glass sensor 101, a second glass sensor 102, a third glass sensor 103 and a speed control device 12, as shown in FIG. 6. The glass sensors 101, 102 and 103 can sense the presence of a glass substrate when the glass substrate enters the detection range. The three glass sensors 101, 102 and 103 are separated in different positions along the transfer direction of the glass substrate. The first glass sensor 101 can be disposed at a position where it can sense the presence of the glass substrate 4 when the front end of the glass substrate 4 passes by the vacuum suction roller 2. The second glass sensor 102 can be disposed at a position where it can sense the presence of the glass substrate 4 when the middle portion of the glass substrate 4 passes by the vacuum suction roller 2. The third glass sensor 103 can be disposed at a position where it can sense the presence of the glass substrate 4 when the rear end of the glass substrate 4 passes by the vacuum suction roller 2. The speed control device 12 is electrically connected to the glass sensors 101, 102 and 103 for receiving the detection signals therefrom and controls the speed of the transfer device 6 based on the position of the glass substrate 4 detected by the glass sensors, therefore controlling the transfer speed of the glass substrate 4.

The buffering device according to the present embodiment can be further modified in various ways. For example, the buffering device can comprise only one glass sensor. When the glass sensor detects the front end of the glass substrate 4 entering the stripping apparatus, the speed of transfer device 6 can be set to follow a prescribed program. Furthermore, the buffering device can simply be a control module for controlling the speed of the transfer device 6, such as a programmable controller or a controller installed on the production line, as long as the control module can control the speed of the transfer device 6.

According to the second embodiment of the present invention, the transfer speed is controlled effectively and thus the force exerted upon the glass substrate 4 by the protective film 3 during stripping operation is reduced, thus reducing the risk of the stripping failure. Furthermore, the transfer speed can be appropriately controlled during different operation stages of the stripping process and the production yield is improved.

The stripping method according to the second embodiment of the present invention will be described in detail hereinafter.

The stripping method according to the second embodiment is substantially similar as the stripping method according to the first embodiment except that the method further comprises a buffering control operation. FIG. 7 is a flow chart showing the buffering control operation in a stripping method according to the second embodiment of the invention. The buffering control operation comprises the following steps.

At step 201, when the front end of a glass substrate 4 passes through a first position, a glass sensor 101 at the first position senses the presence of the glass substrate 4, and a speed control device 12 adjusts the speed of the transfer device 6 accordingly and increases the speed from a first speed value to a second speed value and keeps the transfer device 6 at the second speed value. At step 202, when the front end of the glass substrate 4 passes through a second position, a glass sensor 102 at the second position senses the presence of the glass substrate 4, and the speed control device 12 adjusts the speed of the transfer device 6 accordingly and increases the speed from the second speed value to a third speed value and keeps the transfer device 6 at the third speed value. At step 203, when the front end of the glass substrate 4 passes through a third position, a glass sensor 103 at the third position senses the presence of the glass substrate 4, and the speed control device 12 adjusts the speed of the transfer device 6 accordingly and decreases the speed from the third speed value to a fourth speed value and keeps the transfer device 6 at the fourth speed value.

The first position is a position directly below the vacuum suction roller 2. The second position is a position of the front end of the glass substrate 4 when the middle portion of the glass substrate 4 is directly below the vacuum suction roller 2. The third position is a position of the front end of the glass substrate 4 when the rear end of the glass substrate 4 is directly below the vacuum suction roller 2. The control positions such as the first position, the second and the third positions can also be set differently as necessary. Furthermore, the number of the control positions can be increased or decreased as necessary. The speed of the transfer device can be changed in a step manner by the speed control device 12 based on the positions of the glass substrate 4 detected by the sensors. The control methods can also be changed according to the specific applications. Furthermore, the first, second, third and fourth speed values can be set lightly lower than the values in a conventional apparatus. For example, the first, second, third and fourth speed values can be set as 0 m/s, 0.05 m/s, 0.1 m/s, and 0 m/s, respectively. The speed of the transfer device 6 can also be set to follow a prescribed program.

The above stripping method can detect the result of the stripping operation and provide remediation to the stripping failure in time. The yield can be improved and the adverse effect on the whole production line due to the stripping failure can be minimized. According to the present embodiment, the transfer speed of the product is controlled in a step manner and lowered compared with the transfer speed in a conventional stripping apparatus. Therefore, the force exerted on the product due to the stripping operation is reduced and thus the success ratio of the stripping operation is improved.

The invention being thus described, it will be obvious that the same may be varied in many ways. Such variations are not to be regarded as a departure from the spirit and scope of the invention, and all such modifications as would be obvious to those skilled in the art are intended to be included within the scope of the following claims.

What is claimed is:

1. A method for stripping a film from a product comprising the steps of:
    transferring the product on a transfer device to a film stripping device; and
    stripping the film from the product by the film stripping device,
    wherein the transfer direction of the product is guided by a guiding device along a prescribed direction during the steps of transferring the product and stripping the film from the product, and
    wherein when the product is transferred to a first position along the transfer direction, the transfer speed of the product is increased from a first speed value to a second speed value and keeps at the second speed value;
    when the product is transferred to a second position along the transfer direction, the transfer speed of the product is increased from the second speed value to a third speed value and keeps at the third speed value; and
    when the product is transferred to a third position along the transfer direction, the transfer speed of the product is decreased from the third speed value to a fourth speed value and keeps at the fourth speed value.

2. The method according to claim 1, after the step of stripping the film from the product, further comprising a step of detecting whether the film is completely stripped from the product and a step of transferring the product back for stripping when the film is not completely stripped from the product.

3. The method according to claim 2, wherein the step of detecting whether the film is completely stripped from the product further comprises the steps of:
    detecting whether the film is completely stripped from the product,
    clearing a counter device when the film is completely stripped, otherwise increasing a counter value by one and determining whether the counter value reaches a threshold value; and
    stopping the transfer device when the threshold value is reached, otherwise performing the step of transferring the product back for stripping.

4. The method according to claim 3, further comprising a step of raising an alarm when the threshold value is reached.

5. The method according to claim 1, further comprising a step of detecting a position of the product along the transfer direction.

* * * * *

UNITED STATES PATENT AND TRADEMARK OFFICE
CERTIFICATE OF CORRECTION

PATENT NO.       : 8,137,502 B2                                   Page 1 of 1
APPLICATION NO.  : 12/061555
DATED            : March 20, 2012
INVENTOR(S)      : Jing Su It is certified that error appears in the above-identified patent and that said Letters Patent is hereby corrected as shown below:

On the cover sheet of the patent at item (54) and at column 1, lines 1 and 2, Title "Striping Apparatus and Striping Method" should read -- Stripping Apparatus and Stripping Method --.

Signed and Sealed this
Fifteenth Day of May, 2012

David J. Kappos
*Director of the United States Patent and Trademark Office*